UNITED STATES PATENT OFFICE.

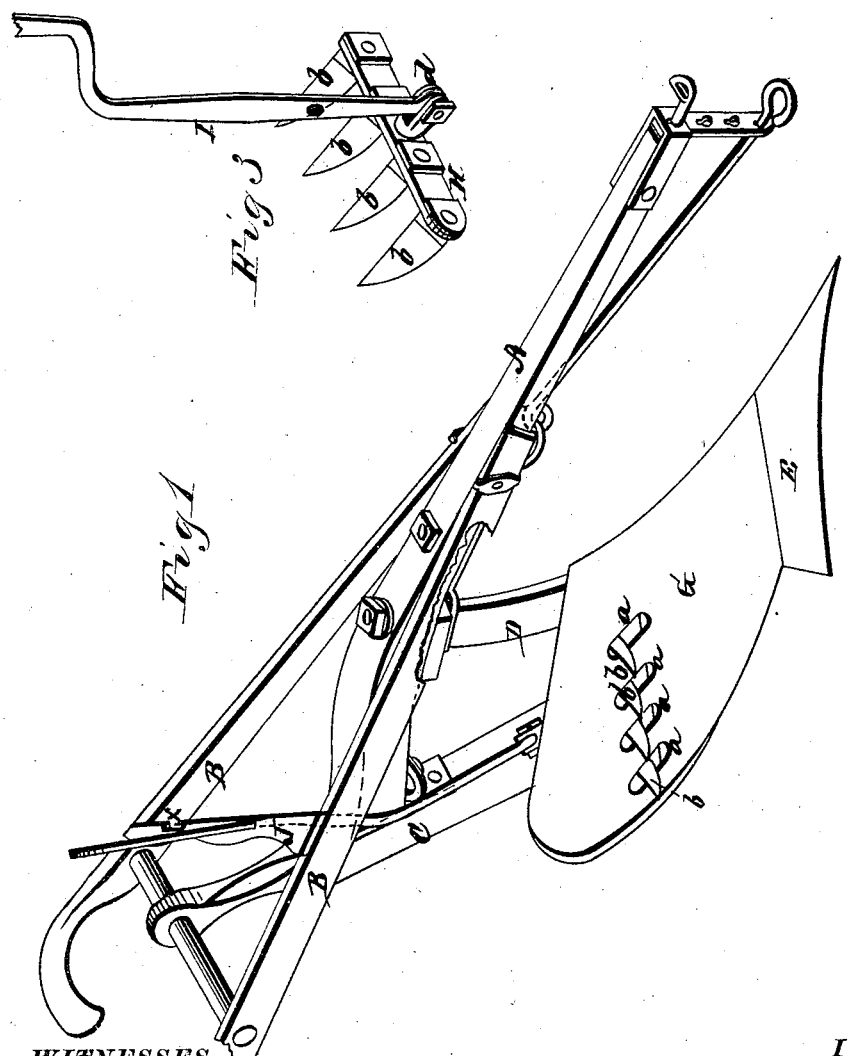

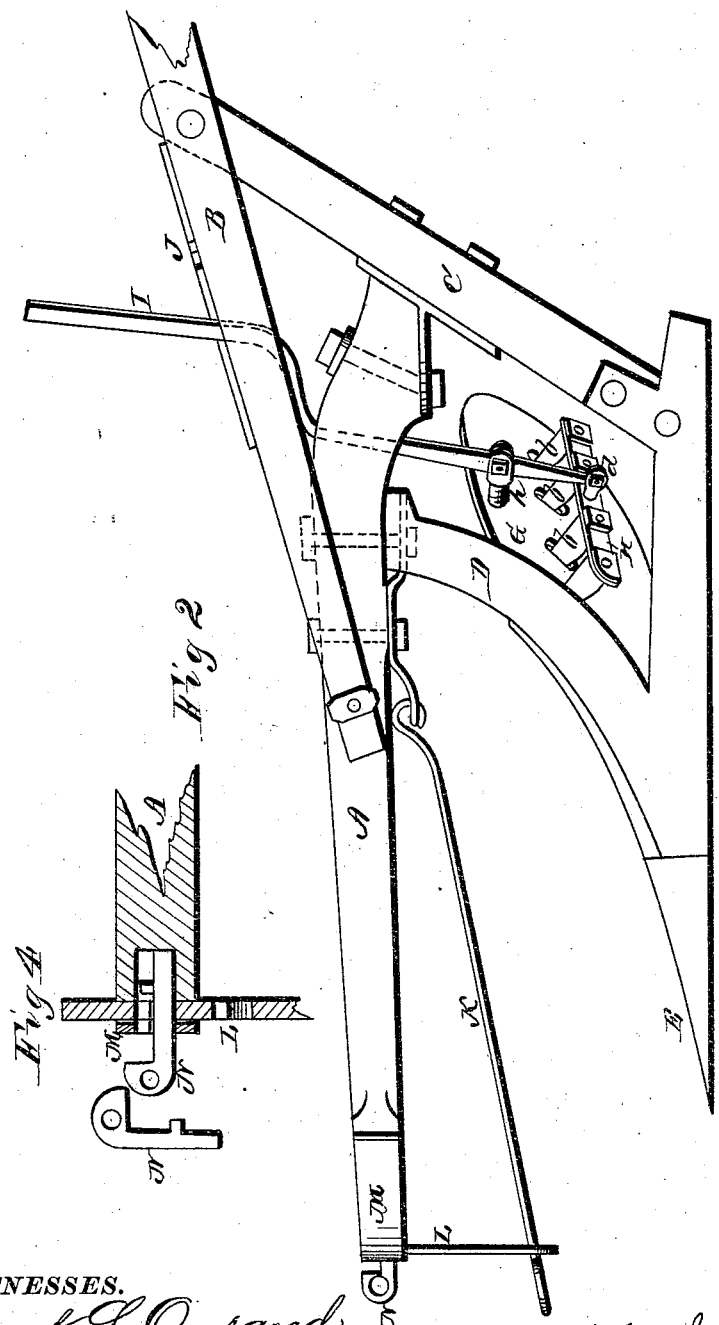

ROSS IRVIN AZBILL, OF EDWARDSPORT, INDIANA.

IMPROVEMENT IN PLOWS.

Specification forming part of Letters Patent No. 153,297, dated July 21, 1874; application filed June 18, 1874.

*To all whom it may concern:*

Be it known that I, ROSS IRVIN AZBILL, of Edwardsport, in the county of Knox and in the State of Indiana, have invented certain new and useful Improvements in Plow; and do hereby declare that the following is a full, clear, and exact description thereof, reference being had to the accompanying drawings and to the letters of reference marked thereon, making a part of this specification.

My invention consists in a series of adjustable knives passing from underneath through slots in the mold-board of a plow, and operated by a suitable lever, all of which will be hereinafter more fully set forth.

In order to enable others skilled in the art to which my invention appertains to make and use the same, I will now proceed to describe its construction and operation, referring to the annexed drawing, in which—

Figure 1 is a perspective view of a plow embodying my invention. Fig. 2 is a side elevation of the same. Fig. 3 is a perspective view of the knives with the lever for operating the same. Fig. 4 is an enlarged section of the front end of the plow-beam with the clevis for regulating the draft.

A represents the plow-beam, B B the handles, C the plow-stock, D the standard, E the share, and G the mold-board, of a plow, constructed in any of the known and usual ways. In the mold-board G is made a series of inclined slots, $a$ $a$, through which project a series of knives, $b$ $b$. These knives are fastened to a bar, H, which is on its rear side provided with a fork, $d$, and in this fork is pivoted the lower end of the lever I, by means of which the knives are adjusted. The lever I is pivoted in a fork, $h$, which is screwed in, or otherwise fastened to the back of the mold-board G near the upper edge. The upper end of the lever may be held in different positions in notches $f$, on a bar, J, secured to the handles B B.

The knives $b$ $b$ serve as pulverizers, and leave the ground in better condition than the same ground plowed by the same plow without the knives, and followed by a harrow. Thus the ground, moist and fresh, is more readily pulverized than after being turned up and exposed to the baking sun for several days.

The knives are regulated according to any depth that the operator may desire to plow, and if the ground is foul, and they should choke the plow, they can be withdrawn, and after the trash slips from the mold-board they may be readjusted, without stopping the team, by means of the lever and notched bar J.

In sod, while the plow turns the sod just as well as any plow, the knives dissect the sods in small pieces, thereby leaving the ground in better condition by far than a harrow. They add no material cost to the plow, and may be applied to any pattern of turning-plow.

K represents the draft-rod, fastened at a suitable point on the under side of the plow-beam A, and the forward end passing through the lower end of a sliding bar, L, which moves in a loop or box, M, attached to the front end of the plow-beam. This bar is provided with a series of key-holes, and one correspondingly-shaped hole made in the loop M and in the end of the plow-beam, so that the bar L can be locked at any desired height. By means of this bar or clevis L the draft may be so regulated on the team as to suit any from the largest to the smallest sized horses.

Having thus fully described my invention, what I claim as new, and desire to secure by Letters Patent, is—

A series of adjustable knives passing from underneath through slots in the mold-board of a plow, and operated by a suitable lever, substantially as and for the purposes herein set forth.

In testimony that I claim the foregoing I have hereunto set my hand this 27th day of May, 1874.

ROSS IRVIN AZBILL.

Witnesses:
JOHN NEIHANT,
GEO. W. AZBELL.